[19] United States Patent
Ito et al.

[11] 4,015,482
[45] Apr. 5, 1977

[54] CONTROL SYSTEM FOR POWER TRAIN AND AUXILIARY EQUIPMENT DRIVEN FROM A COMMON PRIME MOVER

[75] Inventors: Ryuji Ito, Ebina; Mitsuaki Komatsu, Yokohama, both of Japan

[73] Assignee: Kabushiki Kaisha Komatsu Seisakusho, Tokyo, Japan

[22] Filed: Apr. 12, 1976

[21] Appl. No.: 675,884

[30] Foreign Application Priority Data

Apr. 14, 1975 Japan .............................. 50-44248

[52] U.S. Cl. ................................. 74/15.84; 74/664; 192/3.33; 60/435; 60/437; 60/484; 60/DIG. 2
[51] Int. Cl.$^2$ ........................................ F16H 37/00
[58] Field of Search ............ 60/347, 420, 423, 431, 60/435, 437, 439, 441, 484, 698, 711; 192/3.33; 74/15.84, 664

[56] References Cited

UNITED STATES PATENTS

| 3,241,694 | 3/1966 | Pedersen | 74/15.84 X |
|---|---|---|---|
| 3,424,029 | 1/1969 | Horsch et al. | 74/664 |
| 3,583,243 | 6/1971 | Wilson | 74/15.84 |
| 3,822,770 | 7/1974 | Golan | 192/3.33 X |
| 3,822,771 | 7/1974 | Audiffred et al. | 192/3.33 X |
| 3,831,726 | 8/1974 | Woody et al. | 192/103 FA |

Primary Examiner—Edgar W. Geoghegan
Attorney, Agent, or Firm—Armstrong, Nikaido & Wegner

[57] ABSTRACT

A control system for an engine driven power train having a variable torque absorption transmission mechanism typically including a torque converter, in conjunction with a hydraulic control circuit for the implement of an excavating-loading vehicle such as a loader. The control circuit comprises lift and tilt cylinder means connected via respective control valves to a pump driven by the vehicle engine. The pump also communicates with the transmission mechanism via a variable pressure regulator valve which functions to condition the transmission mechanism for a relatively high torque absorption characteristic during vehicle propelling operation so that engine torque may be efficiently transmitted to the drive wheels of the vehicle. When either of the control valves is actuated for raising or tilting back the bucket of the loader, the transmission mechanism is automatically conditioned for a relatively low torque absorption characteristic so that the pump may be driven without any substantial decrease in engine speed.

8 Claims, 5 Drawing Figures

CONTROL SYSTEM FOR POWER TRAIN AND AUXILIARY EQUIPMENT DRIVEN FROM A COMMON PRIME MOVER

BACKGROUND OF THE INVENTION

This invention relates to power trains, as of earthmoving vehicles of the combined excavating-loading type, associated with auxiliary equipment such as hydraulic control circuits for the implement assemblies of the vehicles. More particularly, the invention is directed to a control system for the power train and auxiliary equipment of such a vehicle which are driven by a common prime mover, the control system being designed to enhance the operating efficiency of the vehicle. The invention is herein disclosed as adapted specifically for a loader, but with no unnecessary limitations thereto being intended.

The operations of a loader or like excavating-loading vehicle can be classified into the following three categories from the standpoint of the way the power developed by a prime mover such as an internal combustion engine is utilized: (1) propelling operation, wherein the engine power is used totally for propelling the vehicle; (2) combined propelling-excavating operation, wherein part of the engine power is used for propelling the vehicle and the remainder for actuating the bucket or like implement assembly of the vehicle; and (3) excavating operation, wherein the engine power is used totally for actuating the implement assembly.

The power trains of some excavating-loading vehicles incorporate a hydraulic torque converter the torque absorption characteristic of which can be varied, either continuously or stepwise, by the vehicle operator in accordance with the various operations of the vehicle classified above. The performance of such excavating-loading vehicles can be significantly enhanced if the torque converter is caused to have a relatively high torque absorption characteristic during its propelling operation, and a relatively low torque absorption characteristic during its propelling-excavating operation, as will be later explained in more detail with reference to FIG. 1 of the accompanying drawings. Such manual control of the torque absorption characteristic of the torque converter is objectionable, however, in that it adds to the labor of the operator.

SUMMARY OF THE INVENTION

It is therefore an object of this invention to provide a novel automatic control system which overcomes the above noted objection to the prior art.

In accordance with this invention, a control system is provided for combined use with a power train which is driven by a prime mover such as an internal combustion engine and which includes a variable torque absorption transmission mechanism typically comprising a fluid actuated clutch and a torque converter. The transmission mechanism has an actuating chamber adapted to vary the torque absorption characteristic of the mechanism in response to variable fluid pressure supplied thereto.

Stated in its simplest form, the control system according to the invention includes at least one control valve for controlling communication between a source of fluid under pressure driven by the prime mover and a pair of opposed fluid chambers of fluid actuated cylinder means. The control system further comprises a variable pressure regulator valve through which the source communicates with the actuating chamber of the transmission mechanism, and means for causing the pressure regulator valve to vary the fluid pressure supplied to the actuating chamber in response to establishment of communication between the source and a desired one of the fluid chambers of the cylinder means via the control valve. Thus, the transmission mechanism of the power train is automatically conditioned for a relatively low torque absorption characteristic only upon establishment of communication between the source and the desired fluid chamber of the cylinder means.

According to some preferred embodiments of this invention hereinafter presented, in which the invention is adapted for a loader, the fluid actuated cylinder means comprises lift cylinder means for selectively raising and lowering the bucket of the loader, and tilt cylinder means for tilting or tipping the bucket back and forth, under the control of lift and tilt control valves respectively. During vehicle propelling operation a relatively high torque absorption characteristic is established in the transmission mechanism so that engine torque may be efficiently transmitted to the drive wheels or sprockets of the vehicle. When the lift or tilt control valve is actuated by the operator for raising or tilting back the bucket, the transmission mechanism is automatically conditioned for a relatively low torque absorption characteristic so that the prime mover may not suffer any significant decrease in speed as it drives both power train and auxiliary equipment. The transmission mechanism remains conditioned for the high torque absorption characteristic when either of the control valves is actuated for lowering the bucket or tilting same forwardly. This is because the bucket is usually subject to much less load when being lowered or tilted forwardly than when being raised or tilted backwardly in the excavating operation of the loader. The invention thus materially improves the performance of the vehicle, particularly with regard to its propelling and propelling-excavating operations.

The features which are believed to be novel and characteristic of this invention are set forth in particular in the appended claims. The invention itself, however, both as to its organization and mode of operation, together with additional objects and advantages thereof, will become apparent as the description proceeds, with reference had to the accompanying drawings wherein like reference characters refer to like parts throughout.

DETAILED DESCRIPTION

Figure 1:
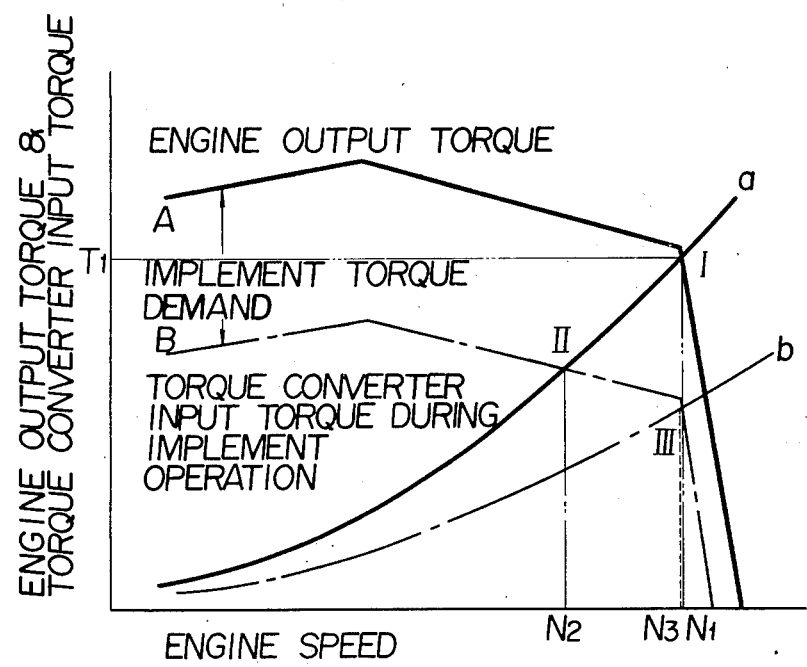
FIG. 1 is a graphical representation of the relationships of the output torque of an engine or like prime mover of an excavating-loading vehicle, and the input torque of a hydraulic torque converter in the vehicle power train during operation of its implement assembly, to the engine speed, the graph being explanatory of the principles on which this invention is based.

Prior to the presentation of some preferred embodiments of this invention, the graph of FIG. 1 will be briefly explained to make clear the features and advantages of the invention. In the graph, A represents the curve of the output torque of an internal combustion engine or like prime mover of an excavating-loading vehicle, such as a loader, plotted against the speed of the engine. Subtraction of the torque consumed by the implement assembly of the vehicle from the engine output torque provides curve B, which represents the input torque, during operation of the implement assembly, of a hydraulic torque converter employed in the power train between the engine and the drive wheels or sprockets of the vehicle (see FIG. 3).

As is well known, the torque capacity of a torque converter is roughly proportional to the square of the input speed. Curve $a$ in the graph of FIG. 1 represents the torque absorption characteristic of a torque converter with a relatively high torque capacity, and curve $b$ the torque absorption characteristic of a torque converter with a relatively low torque capacity.

During the aforementioned propelling operation of the vehicle, no torque is demanded by its implement assembly, so that the complete torque output of the engine can be delivered to the torque converter. The use of the torque converter with the high torque absorption characteristic (curve $a$) is therefore advantageous during the propelling operation, because then a high torque value (indicated at T1 in FIG. 1) can be obtained for propelling the vehicle.

If then the torque output of the vehicle engine is utilized also for actuating the implement assembly, however, the input torque of the torque converter lowers from curve A to curve B. As a consequence, the clutch point of the torque converter shifts from I to II in the graph of FIG. 1, with the significant decrease in the engine speed, from N1 to N2. The pump for driving the implement assembly is then driven at the decreased engine speed, so that the operating speed of the implement also decreases.

If, in the above instance, the torque converter in use has the low torque absorption characteristic (curve $b$), then the clutch point will shift merely from I to III in the graph. The resulting decrease in the engine speed, from N1 to N3, is then negligible, and the displacement of the pump per unit length of time can be made much higher than when the torque converter has the high torque absorption characteristic.

Thus, for higher overall operating efficiency of the excavating-loading vehicle, the torque converter in use should be conditioned for a relatively high torque absorption characteristic during the propelling operation of the vehicle, and for a relatively low torque absorption characteristic during the propelling-excavating operation of the vehicle.

Figure 2:
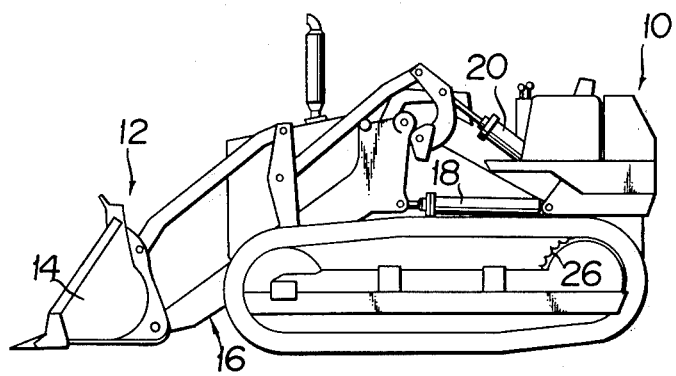
FIG. 2 is a side elevation of a loader to which the principles of the invention are applicable.

FIG. 2 illustrates a loader as an example of excavating-loading vehicles to which are applicable the principles of this invention. The illustrated loader broadly comprises a crawler tractor 10 and an implement assembly 12 mounted thereon. The implement assembly 12 comprises a work implement in the form of a bucket 14, and a linkage system 16 operatively connecting the bucket to the tractor 10. The loader is further provided with first or lift cylinder means 18 comprising a pair of laterally spaced hydraulic cylinders (one shown) for selectively raising and lowering the bucket 14 relative to the tractor via the linkage system 16, and second or tilt cylinder means 20 also comprising a pair of laterally spaced hydraulic cylinders (one shown) for tilting or tipping the bucket forwardly or backwardly relative to the tractor via the linkage system.

Figure 3:
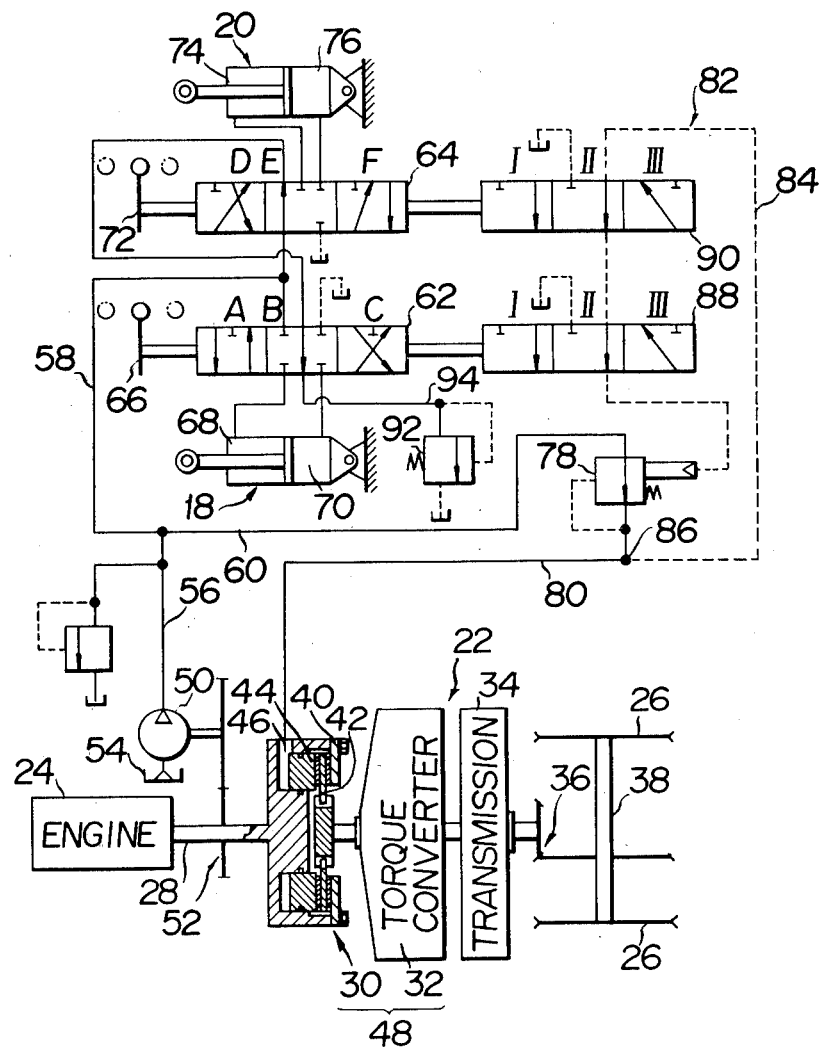
FIG. 3 is a schematic representation of the power train and hydraulic control circuit of the loader of FIG. 2 incorporating a preferred form of the control system according to the invention, with a fluid actuated clutch in the power train being shown in section.

In FIG. 3, which illustrates the first preferred embodiment of this invention, the reference numeral 22 generally designates the power train connecting the prime mover or engine 24 to the drive wheels or sprockets 26 of the loader shown in FIG. 2. The power train 22 comprises drive shaft 28, fluid actuated clutch 30, torque converter 32, transmission speed ratio section 34, bevel gearing 36, and axle 38 connected to the pair of sprockets 26.

The clutch 30 has a drive member 40 and driven member 42 which can be urged against each other under variable pressure from an acutating piston 44 which in turn is acted upon by variable hydraulic fluid pressure in an actuating chamber 46. As will be apparent, the torque converter 32 is conditioned for a relatively high torque absorption characteristic upon increase in the fluid pressure in the actuating chamber 46 of the clutch 30, and for a relatively low torque absorption characteristic upon decrease in the fluid pressure in the actuating chamber. The clutch 30 and torque converter 32 constitute in combination a variable torque absorption transmission mechanism generally labeled 48.

Shown at 50 is a pump or like source of fluid under pressure driven from the engine 24 to actuate the first and second cylinder means 18 and 20 as well as the clutch 30 via valving hereinafter described. Geared at 52 to the drive shaft 28, the pump 50 draws fluid, preferably hydraulic oil, from a reservoir 54 and discharges the pressurized fluid into an outlet conduit 56. This outlet conduit divides into an implement conduit 58 and a clutch conduit 60.

The implement conduit 58 operatively connects the pump 50 to a first or lift control valve 62 and to a second or tilt control valve 64. The lift control valve 62 has DOWN position A, neutral position B, and UP position C. Normally held in neutral to discommunicate the lift cylinder means 18 from the pump 50, the lift control valve 62 can be manually shifted by a lift control lever 66 to either of its DOWN and UP positions A and C to control fluid flow into and out of the rod and head end chambers 68 and 70 of the lift cylinder means 18. The bucket 14 can thus be selectively raised and lowered relative to the tractor 10, as will be seen by referring back to FIG. 2.

The tilt control valve 64 has FORWARD position D, neutral position E, and BACKWARD position F. Also normally held in neutral to discommunicate the tilt cylinder means 20 from the pump 50, the tilt control valve 64 can be manually shifted by a tilt control lever 72 to either of its FORWARD and BACKWARD positions D and F to control fluid flow into and out of the rod and head end chambers 74 and 76 of the tilt cylinder means 20. The bucket 14 can therefore be tilted forwardly or backwardly as desired relative to the tractor 10.

The aforesaid clutch conduit 60 communicates the pump 50 with the actuating chamber 46 of the clutch 30 via a variable pressure regulator valve 78 and conduit 80. The pressure regulator valve 78, which is shown to be a pilot operated pressure reducing valve, is adapted to deliver relatively high fluid pressure to the actuating chamber 46 when applied with pilot pressure and to deliver relatively low fluid pressure to the actuating chamber when applied with no pilot pressure.

The reference numeral 82 generally designates a pilot circuit for controlling the operation of the pressure regulator valve 78. The pilot circuit 82 includes a pilot conduit 84 which is operatively connected at 86 to the conduit 80 on the one hand and, on the other hand, to the pressure regulator valve 78. Also included in the pilot circuit 82 are first and second selector valves 88 and 90 which are operatively connected in series to the pilot conduit 84. Each of the first and second selector valves 88 and 90 has first and second positions I and II, where each selector valve is opened to complete the pilot circuit 82, and a third or drain position III where each selector valve is closed to block the pilot circuit. The first and second selector valves 88 and 90 are interlocked with the lift control valve 62 and tilt control valve 64 so as to be actuated simultaneously therewith by the lift control lever 66 and tilt control lever 72, respectively.

In operation, let it be assumed that the engine 24 is in operation while the lift control valve 62 and tilt control valve 64 are both in neutral as represented by FIG. 3. Pressurized fluid from the pump 50 is communicated, on the one hand, by way of the implement conduit 58 and neutralized control valves 64 and 62 to a relief valve 92 operatively connected to a drain conduit 94 and is thereby held at a predetermined pressure.

On the other hand, the pump 50 supplies pressure to the conduit 80 by way of the clutch conduit 60 and pressure regulator valve 78. Since the first and second selector valves 88 and 90 are now assumed to be both in their second positions II, the pilot circuit 82 is completed to apply pilot pressure to the pressure regulator valve 78, with the consequent increase in the fluid pressure supplied to the actuating chamber 46 of the clutch 30. The drive and driven members 40 and 42 of the clutch are then urged against each other to such an extent that the output power of the engine 24 is transmitted almost completely to the torque converter 32. As a result, the torque converter 32 is conditioned for a relatively high torque absorption characteristic such as represented by the curve a in the graph of FIG. 1, so that the engine power can be efficiently transmitted to the sprockets 26 of the vehicle to facilitate its propelling operation.

If now the lift control valve 62 is shifted to its UP position C by the lift control lever 66, pressurized fluid from the pump 50 will be supplied therethrough into the head end chamber 70 of the lift cylinder means 18 thereby causing same to raise the bucket 14. Since then the first selector valve 88 is simultaneously shifted to its drain position III, the pilot circuit 82 is blocked to suspend the supply of pilot pressure to the pressure regulator valve 78, with the consequent drop in the fluid pressure delivered therethrough into the actuating chamber 46 of the clutch.

As will be evident, a slip now occurs between the drive and driven members 40 and 42 of the clutch so that the engine power is not totally transmitted therethrough to the torque converter 32. With the torque converter thus conditioned for a relatively low torque absorption characteristic such as represented by the curve b in the graph of FIG. 1, the engine 24 suffers no substantial decrease in speed as it drives both power train and hydraulic control circuit of the loader. The pump 50 can therefore be driven at relatively high engine speed to cause the lift cylinder means 18 to raise the bucket 14 at relatively high speed.

If, in the condition of FIG. 3, the tilt control valve 64 is shifted to its BACKWARD position F by the tilt control lever 72, pressurized fluid from the pump 50 will be supplied therethrough into the rod end chamber 74 of the tilt cylinder means 20 to cause same to tilt the bucket 14 backwardly. The second selector valve 90 interlocked with the tilt control valve 64 is simultaneously shifted to its drain position III to block the pilot circuit 82. Thus, through the procedure previously set forth in connection with the shifting of the lift control valve 62 to its UP position, the engine 24 drives the pump 50 at relatively high speed, so that the tilt cylinder means 20 can be actuated at relatively high fluid pressure to tilt the bucket 14 backwardly.

When the lift control valve 62 is shifted to its DOWN position A, or when the tilt control valve 64 is shifted to its FORWARD position D, the first or second selector valve 88 or 90 is shifted to its first position I, so that the pilot circuit 82 is held completely to apply pilot pressure to the pressure regulator valve 78. As a consequence, the clutch 30 continues transmitting almost all of the engine power to the torque converter 32.

Although the engine 24 thus suffers a significant decrease in speed in the above instances, this is acceptable because no great fluid pressure is usually required for lowering the bucket of the loader or for tilting same forwardly. Since the engine power can instead be effectively transmitted to the sprockets 26, the overall efficiency of the propelling-excavating operation of the vehicle is unimpaired.

Figure 4:
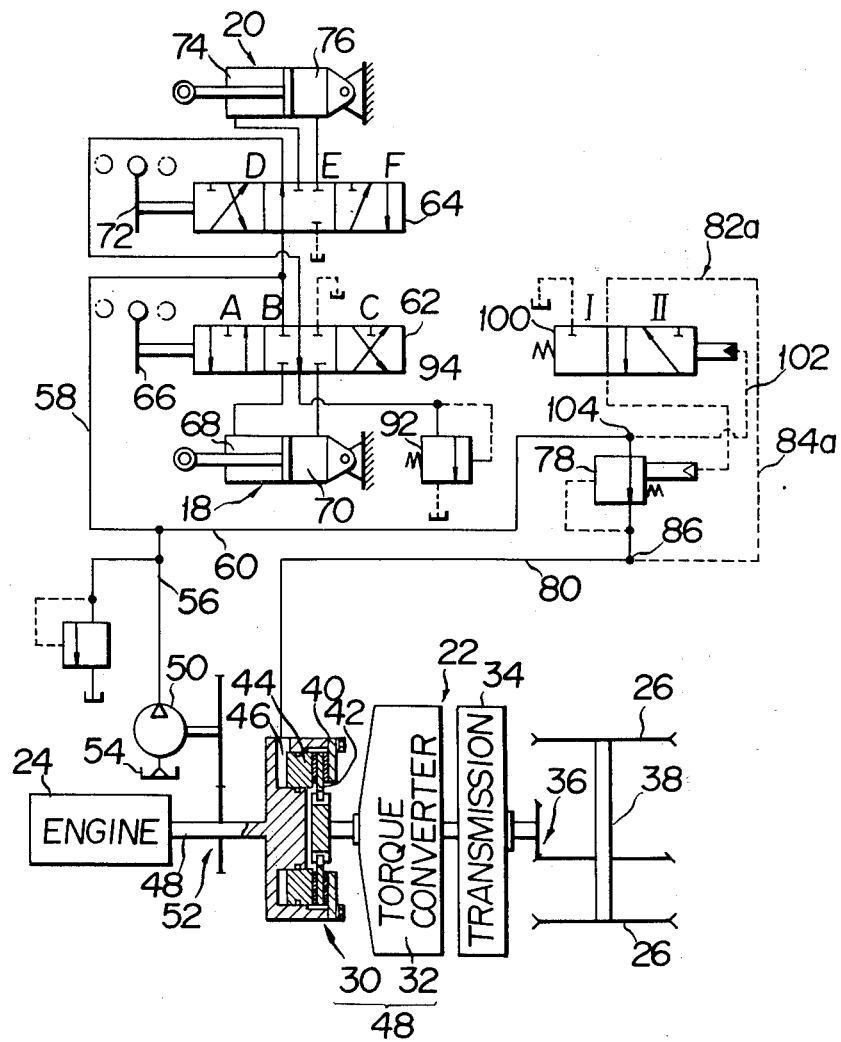
FIG. 4 is a schematic representation, similar to FIG. 3, of another preferred embodiment of the invention.

FIG. 4 illustrates another preferred embodiment of the invention, which includes a simplified pilot circuit 82a for controlling the operation of the pressure regulator valve 78. The pilot circuit 82a includes a pilot conduit 84a which is operatively connected at 86 to the conduit 80 on the one hand and, on the other hand, to the pressure regulator valve 78. Operatively connected to this pilot conduit 84a is a pilot operated two-position selector valve 100 which replaces the first and second selector valves 88 and 90 of the preceding embodiment. The selector valve 100 has its pilot conduit 102 operatively connected at 104 to the clutch conduit 60 communicating the pump 50 with the pressure regulator valve 78.

The selector valve 100 is shifted automatically between its first and second positions I and II in response to fluid pressure in the clutch conduit 60. Normally, that is, when the pressure in the clutch conduit 60 is relatively low, the selector valve 100 is held in its first position I so that the pilot circuit 82a is completed to supply pilot pressure to the pressure regulator valve 78. Relatively high fluid pressure is therefore supplied to the actuating chamber 46 of the clutch 30.

Fluid pressure in the clutch conduit 60 rises only when the lift control valve 62 is shifted to its UP position C or when the tilt control valve 64 is shifted to its BACKWARD position F, because then greater load is usually imposed on the lift or tilt cylinder means 18 or 20 with which the clutch conduit communicates. As a consequence, the selector valve 100 is shifted to its second position II to block the pilot circuit 82a, with the result that relatively low fluid pressure is supplied to the actuating chamber 46 of the clutch 30. It will now be apparent that the simplified pilot circuit of FIG. 4 is well calculated to perform the same functions as the pilot circuit 82 of FIG. 3. Other details of construction and operation are exactly as previously set forth with particular reference to FIG. 3.

Figure 5:
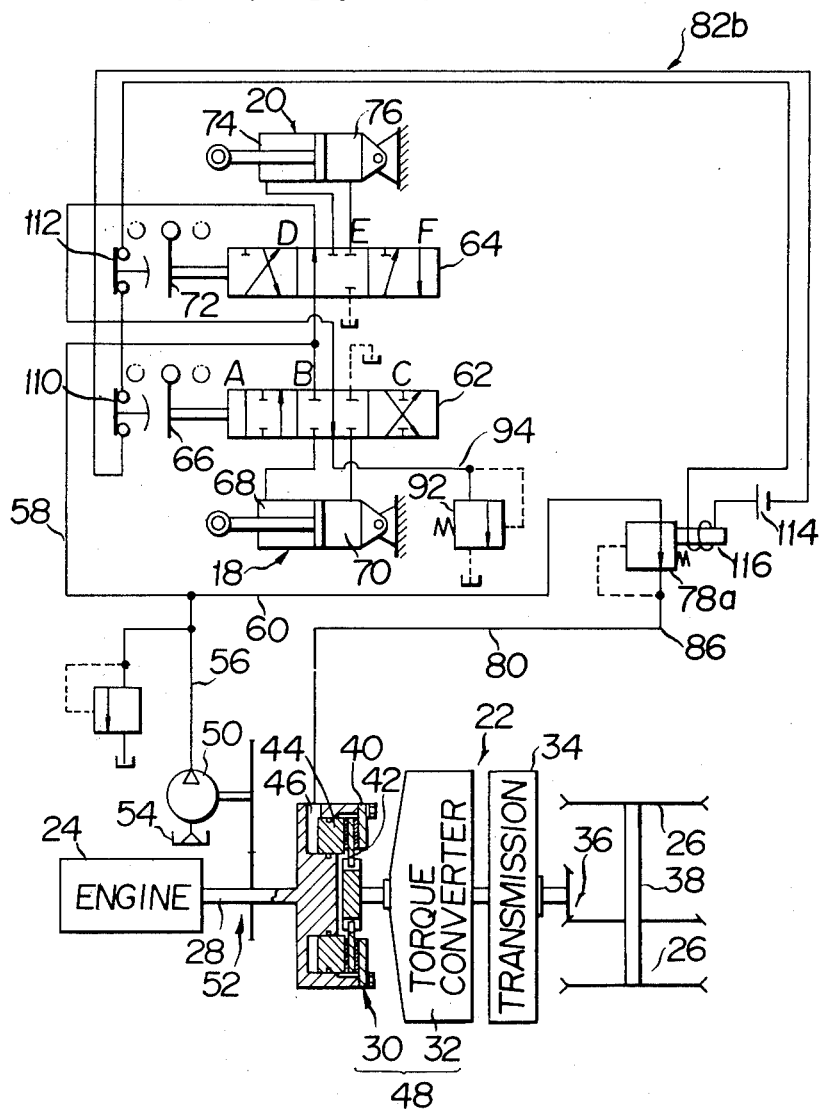
FIG. 5 is also a similar schematic representation of still another preferred embodiment of the invention.

In FIG. 5, which illustrates still another preferred embodiment of the invention, the pilot circuits of the foregoing embodiments are replaced by an electric circuit 82b adapted to control the operation of a solenoid operated pressure regulator valve 78a. The electric circuit 82b comprises series-connected first and second limit switches 110 and 112, power supply 114, and solenoid 116. Normally held closed, the first and second limit switches 110 and 112 are adapted to be opened by the lift control lever 66 and tilt control lever 72 only when these levers are actuated by the operator to shift the lift control valve 62 and tilt control valve 64 to their UP and BACKWARD positions C and F, respectively.

Normally, therefore, the solenoid 116 is held energized, and under this condition the pressure regulator valve 78a supplies relatively high fluid pressure to the actuating chamber 46 of the clutch 30. When either of the lift control lever 66 and tilt control lever 72 is moved leftwardly as viewed in FIG. 5, the corresponding limit switch 110 or 112 is opened to deenergize the solenoid 116 and hence to cause a decrease in the fluid pressure supplied to the actuating chamber 46 of the clutch. Other details of construction and operation are identical with those described above in connection with FIG. 3.

While this invention has been shown and described hereinbefore in terms of its several preferred embodiments, it is not desired to limit the invention to the exact constructional or operational details disclosed. For example, a friction clutch may be employed in lieu of the torque converter 32 of the variable torque absorption transmission mechanism 48. It is also possible to eliminate the clutch 30 and, instead, to split the pump impeller of the torque converter into two sections, with one of the pump sections made capable of being fixed or rotated as required. These and other modifications or changes which will readily occur to those skilled in the art are intended to be covered within the scope of the following claims.

What is claimed is:
1. In combination with a power train driven by a prime mover and including a variable torque absorption transmission mechanism which has an actuating chamber effective to vary the torque absorption characteristic of the transmission mechanism in response to variable fluid pressure supplied thereto, a system comprising:
 a source of fluid under pressure;
 means operatively connecting the source to the power train at a point intermediate the prime mover and the transmission mechanism whereby the source is driven by the prime mover;
 at least one control valve operatively connected to the source;
 fluid actuated cylinder means operatively connected to the control valve and having a pair of opposed fluid chambers, the control valve being adapted to control communication between the source and the fluid chambers of the cylinder means;
 a variable pressure regulator valve through which the source communicates with the actuating chamber of the transmission mechanism; and
 means for causing the pressure regulator valve to vary the fluid pressure supplied to the actuating chamber of the transmission mechanism in response to establishment of communication between the source and a predetermined one of the fluid chambers of the cylinder means by the control valve;
 whereby the transmission mechanism is automatically conditioned for a relatively low torque absorption characteristic upon establishment of communication between the source and the predetermined fluid chamber of the cylinder means.

2. The system of claim 1, wherein the pressure regulator valve is a pilot operated valve, and wherein the means for causing the pressure regulator valve to vary the fluid pressure supplied to the actuating chamber includes a pilot circuit for normally applying pilot pressure to the pressure regulator valve, the pilot circuit including a selector valve interlocked with the control valve whereby, when the control valve establishes communication between the source and the predetermined fluid chamber of the cylinder means, the selector valve operates simultaneously to cause the pilot circuit to terminate the application of pilot pressure to the pressure regulator valve.

3. The system of claim 1, wherein the pressure regulator valve is a pilot operated valve, and wherein the means for causing the pressure regulator valve to vary the fluid pressure supplied to the actuating chamber includes a pilot circuit for normally applying pilot pressure to the pressure regulator valve, the pilot circuit including a pilot operated selector valve adapted to receive pilot pressure from a conduit connecting the source to the control valve, whereby upon establishment of communication between the source and the predetermined fluid chamber of the cylinder means by the control valve, the selector valve operates to cause the pilot circuit to terminate the application of pilot pressure to the pressure regulator valve.

4. The system of claim 1, wherein the pressure regulator valve is adapted to be operated electrically, and wherein the means for causing the pressure regulator valve to vary the fluid pressure supplied to the actuating chamber includes electrical switch means operatively connected to the pressure regulator valve, the switch means being adapted to be actuated upon establishment of communication between the source and the predetermined fluid chamber of the cylinder means by the control valve.

5. The system of claim 4, wherein the pressure regulator valve is a solenoid operated valve having a solenoid adapted to be selectively energized and deenergized by the switch means.

6. In combination with a power train driven by a prime mover and including a variable torque absorption transmission mechanism which has an actuating chamber adapted to vary the torque absorption characteristic of the transmission mechanism in response to variable fluid pressure supplied thereto, a system comprising:
 a source of fluid under pressure;
 means operatively connecting the source to the power train at a point intermediate the prime mover and the transmission mechanism whereby the source is driven by the prime mover;
 first fluid actuated cyclinder means having a pair of opposed fluid chambers;
 a first control valve for controlling communications between the source and the fluid chambers of the first cylinder means;

second fluid actuated cylinder means having a pair of opposed fluid chambers;

a second control valve for controlling communication between the source and the fluid chambers of the second cylinder means;

a variable pressure regulator valve through which the source communicates with the actuating chamber of the transmission mechanism; and means for causing the pressure regulator valve to vary the fluid pressure supplied to the actuating chamber of the transmission mechanism in response to establishment of communication between the source and a predetermined one of the fluid chambers of the first or second cylinder means by the first or second control valve;

whereby the transmission mechanism is automatically conditioned for a relatively low torque absorption characteristic upon establishment of communication between the source and the predetermined fluid chamber of the first or second cylinder means.

7. The system of claim 6, wherein the pressure regulator valve is a pilot operated valve, and wherein the means for causing the pressure regulator valve to vary the fluid pressure supplied to the actuating chamber includes a pilot circuit for normally applying pilot pressure to the pressure regulator valve, the pilot circuit including two selector valves interconnected in series and interlocked with the first and second control valves respectively, whereby when the first or second control valve operates to establish communication between the source and the predetermined fluid chamber of the first or second cylinder means, the corresponding one of the selector valves operates simultaneously to cause the pilot circuit to terminate the application of pilot pressure to the pressure regulator valve.

8. The system of claim 6, wherein the pressure regulator valve is a solenoid operated valve, wherein the first and second control valves are each adapted to be operated by a control member, and wherein the means for causing the pressure regulator valve to vary the fluid pressure supplied to the actuating chamber comprises first and second electrical switch means interconnected in series and operatively connected to the solenoid of the pressure regulator valve, the first and second switch means being normally closed to hold the solenoid energized and being adapted to be actuated respectively by the control members of the first and second control valves, whereby when the first or second control valve is operated by the control member to establish communication between the source and the predetermined fluid chamber of the first or second cylinder means, the corresponding one of the first and second switch means is opened to deenergize the solenoid of the pressure regulator valve.

* * * * *